US005560638A

United States Patent [19]

Lee

[11] Patent Number: 5,560,638

[45] Date of Patent: Oct. 1, 1996

[54] REAR SUSPENSION SYSTEM FOR VEHICLE

[75] Inventor: Unkoo Lee, Kyungki-do, Rep. of Korea

[73] Assignee: Hyundai Motor Company, Seoul, Rep. of Korea

[21] Appl. No.: 431,752

[22] Filed: May 1, 1995

[51] Int. Cl.$^{6}$ .............................. B60G 3/20; B60G 15/06

[52] U.S. Cl. ........................... 280/690; 280/701; 280/726

[58] Field of Search .................................... 280/690, 701, 280/697, 696, 724, 725, 726, 666, 663

[56] References Cited

U.S. PATENT DOCUMENTS

| | | | |
|---|---|---|---|
| 2,278,303 | 3/1942 | Blaser | 280/701 |
| 3,630,303 | 12/1971 | Froumajou | 280/666 |
| 4,635,957 | 1/1987 | Merkle | 280/663 |
| 4,790,560 | 12/1988 | Asanuma et al. | 280/690 |
| 4,813,704 | 3/1989 | Smith | 280/697 |
| 4,848,789 | 7/1989 | Timoney et al. | 280/701 |
| 4,941,677 | 7/1990 | Matsumoto et al. | 280/690 |
| 5,102,159 | 4/1992 | Sato et al. | 280/690 |
| 5,382,044 | 1/1995 | Smith et al. | 280/690 |

FOREIGN PATENT DOCUMENTS

| | | | |
|---|---|---|---|
| 6-24221 | 2/1994 | Japan | 280/697 |
| 1180728 | 2/1970 | United Kingdom . | |
| 2246329 | 1/1992 | United Kingdom . | |

*Primary Examiner*—Anne Marie Boehler
*Assistant Examiner*—Peter C. English
*Attorney, Agent, or Firm*—Birch, Stewart, Kolasch & Birch, LLP

[57] ABSTRACT

A rear suspension system for a car body is disclosed including a wheel carrier for rotatably supporting a wheel, the wheel carrier including an extending portion which extends higher than either an inner side of the wheel or the wheel, and a lower part having a through-hole through which an axle can pass. An upper control arm is provided for connecting an upper end of the extending portion of the wheel carrier with a car body, and a lower control arm connects the lower part of the wheel carrier with the car body. A trailing arm is disposed in a longitudinal direction of the car body for connecting a front side of the wheel carrier with the car body. Two absorbing members are respectively assembled as a shock absorber and a spring and are arranged respectively between a subframe and the lower control arm at a front and rear of the axle.

7 Claims, 4 Drawing Sheets

31
3
30
22
81
80
8
5
510
511
51
45
41
20
44
2
43
42
71
70
4
7
40
500
501
50

REAR SUSPENSION SYSTEM FOR VEHICLE

BACKGROUND OF THE INVENTION

1. Field of the Invention

The invention relates to a rear suspension system for a vehicle, and more particularly, to a rear suspension system which can improve riding comfort, enlarge the inner space of the vehicle and enhance both controllability and stability at cornering by arranging two absorbing members respectively in a sub frame at front and rear portions of an axle.

2. Description of Related Art

Generally, a suspension system connects an axle with a frame and absorbs impact and vibration from roads to improve riding comfort and car safety.

The vertical connection of the suspension must be flexible to reduce impacts and vibrations from roads and the horizontal connection of the suspension must be strong to overcome the driving force, braking force and cornering force, all of which happen in the wheel.

The suspension system is classified into either a rigid axle suspension type or an independent suspension type.

Recently most of the cars adopt the multi-link type independent suspension since it has better riding comfort.

The multi-link type independent suspension includes at least four links which compose control arms, and it has a high free lay out degree.

Generally, the multi-link type independent suspension, as shown in FIG. 4, includes: a wheel carrier 100 which rotatably supports a wheel; an upper control arm 102 for connecting the upper portion of the wheel carrier 100 with a car body; a lower control arm 104 for connecting the lower portion of the wheel carrier 100 with the car body; a strut arm 110 formed as an assembly of a shock absorber 106 and a spring 108, the lower end of which is connected with the lower control arm 104 and the upper end of which suspends and supports the car body.

The above described conventional suspension system will have a variable mechanical feature in accordance with the arrangement or the length of each link, so it has a high free lay out degree.

The force applied to the wheel is distributed to each link, so it is possible to enhance both controllability and riding comfort.

The above conventional suspension system has a problem if it is adopted as a rear suspension system for a rear wheel drive vehicle because there is interference between a driving axle and a spring or a strut assembly, although it has no problem as a rear suspension system for a front wheel drive vehicle.

To solve the above problem, if the lower part of the absorbing member of the conventional suspension system is diverged into front and rear, then the axle can pass through the diverged space.

But, in this case, the upper part of the absorbing member should be raised thereby overshooting a value of the axle upon vibration of the wheel in order to prevent the axle from contacting the diverging portion, such that another problem happens, wherein the inner space of car becomes small.

SUMMARY OF THE INVENTION

The invention has been made in an effort to solve the above problems.

It is an object of the invention to provide a rear suspension system for a rear wheel drive vehicle which can improve riding comfort and enlarge the inner space of the vehicle by arranging two absorbing members respectively in a sub frame at front and rear portions of a driving axle.

It is another object of the invention to provide the rear suspension system which can enhance both controllability and stability at cornering.

To achieve the above objects, the invention provides a rear suspension system comprising: a wheel carrier for rotatably supporting a wheel, the wheel carrier having an extending portion which extends to upright until it can be higher than the inner side of the wheel or the wheel, and a lower part which has a through hole through which the driving axle can pass; an upper control arm for connecting the upper end of the extending portion of wheel carrier with a vehicle body; a lower control arm for connecting the lower part of the wheel carrier with the vehicle body, a trailing arm disposed in longitudinal direction of the vehicle for connecting the front side of the wheel carrier with the vehicle body; and two absorbing members respectively assembled by a shock absorber and a spring and arranged respectively between a sub frame and the lower control arm at a front and rear portion of the axle.

The extending portion of the wheel carrier is bent towards the wheel side and a gap is defined between its upper end and an upper side of the wheel.

The wheel side connecting portion of the upper control arm is connected with the upper end of the extending portion of the wheel carrier by a ball joint, and the vehicle body side connecting portion of the upper control arm is diverged into front and rear and is connected with the vehicle body by an elastic bushing.

The lower control arm includes a front lower control arm and a rear lower control arm, and the wheel side connecting portions of each arm meet each other in the same plane and are connected with the lower part of the wheel carrier by a ball joint, and the vehicle body side connecting portions of each arm are connected with the sub frame by elastic bushings.

The absorbing members is characterized in $Kf<Kr$ and $Cf>Cr$, where spring constant, damping coefficient of the front absorbing member are Kf and Cf respectively and spring constant, damping coefficient of the rear absorbing member are Kr and Cr, respectively.

DESCRIPTION OF THE PREFERRED EMBODIMENTS

The preferred embodiment of the invention will be explained in detail with reference to the drawings.

Figure 1:
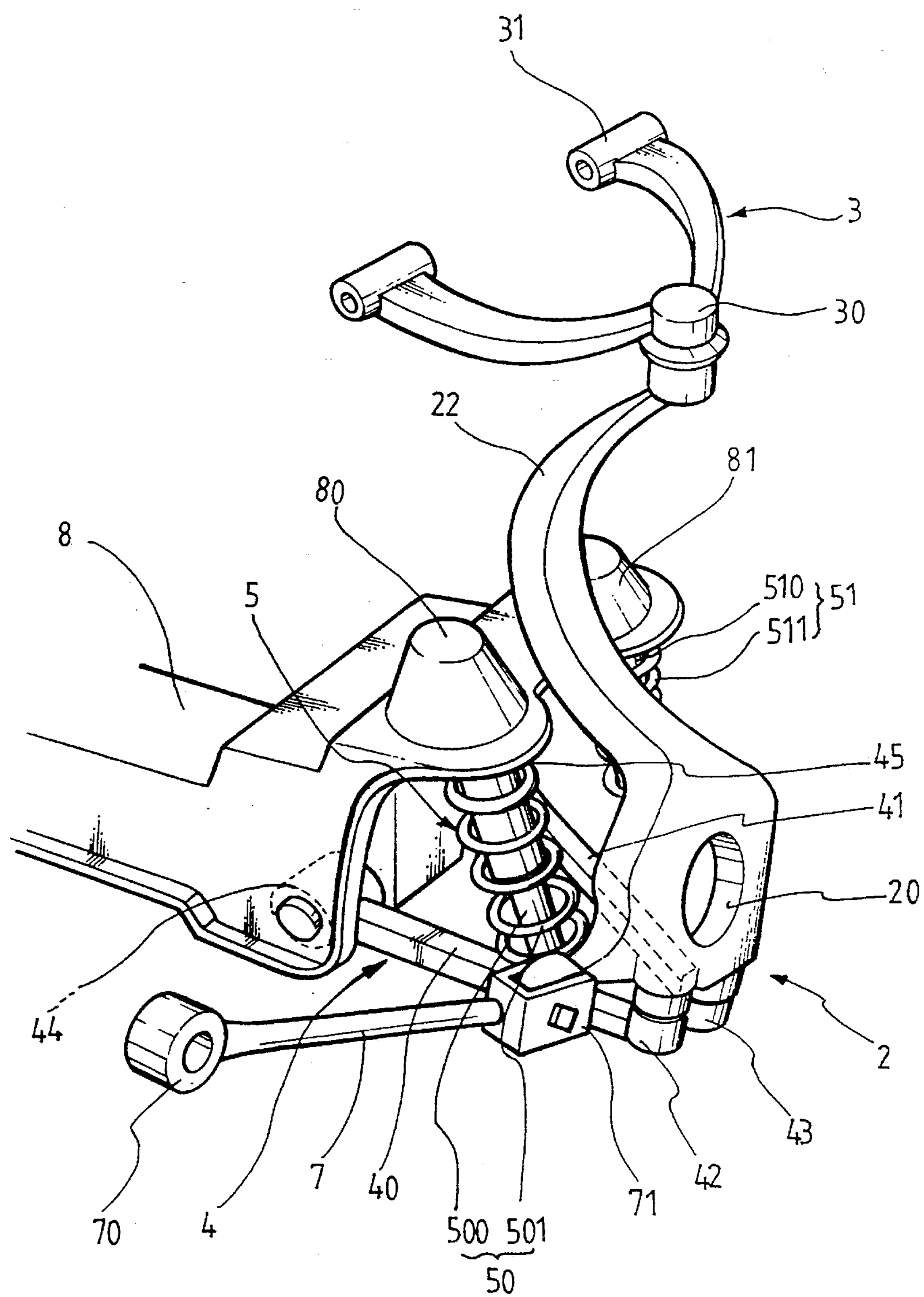
FIG. 1 is a perspective view of a rear suspension system related to a preferred embodiment of the invention.
Figure 2:
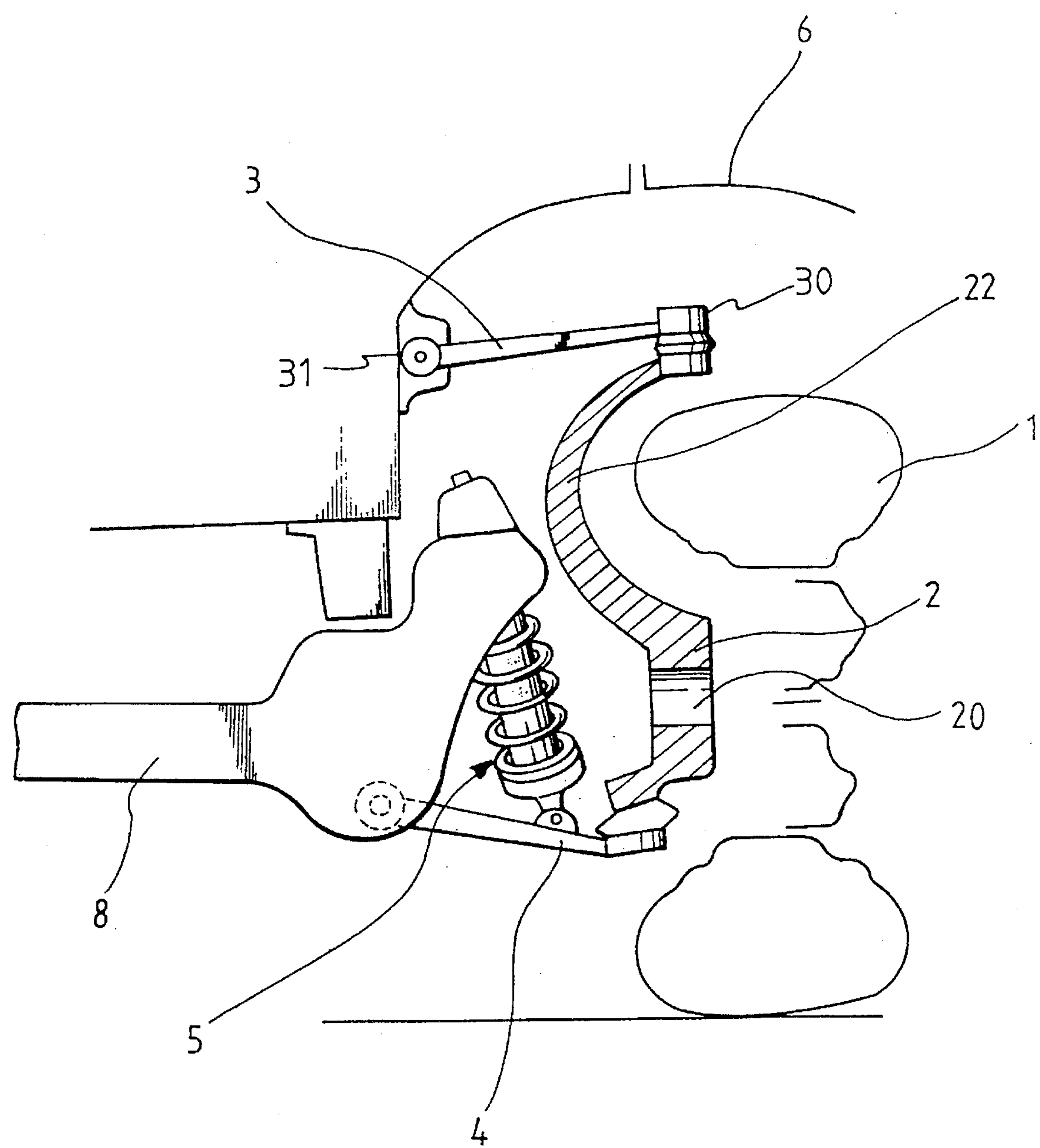
FIG. 2 is a rear elevation of the rear suspension system related to a preferred embodiment of the invention.
Figure 3:
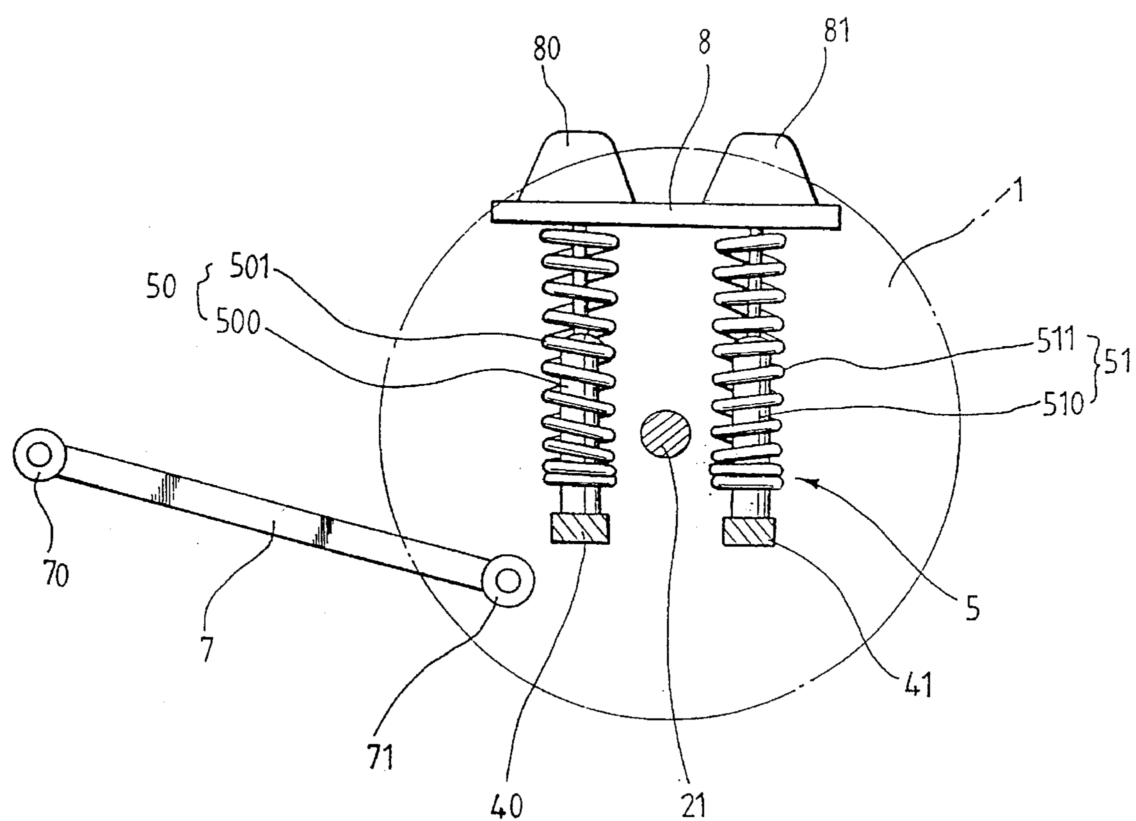
FIG. 3 is a side view of the rear suspension system related to a preferred embodiment of the invention.
Figure 4:
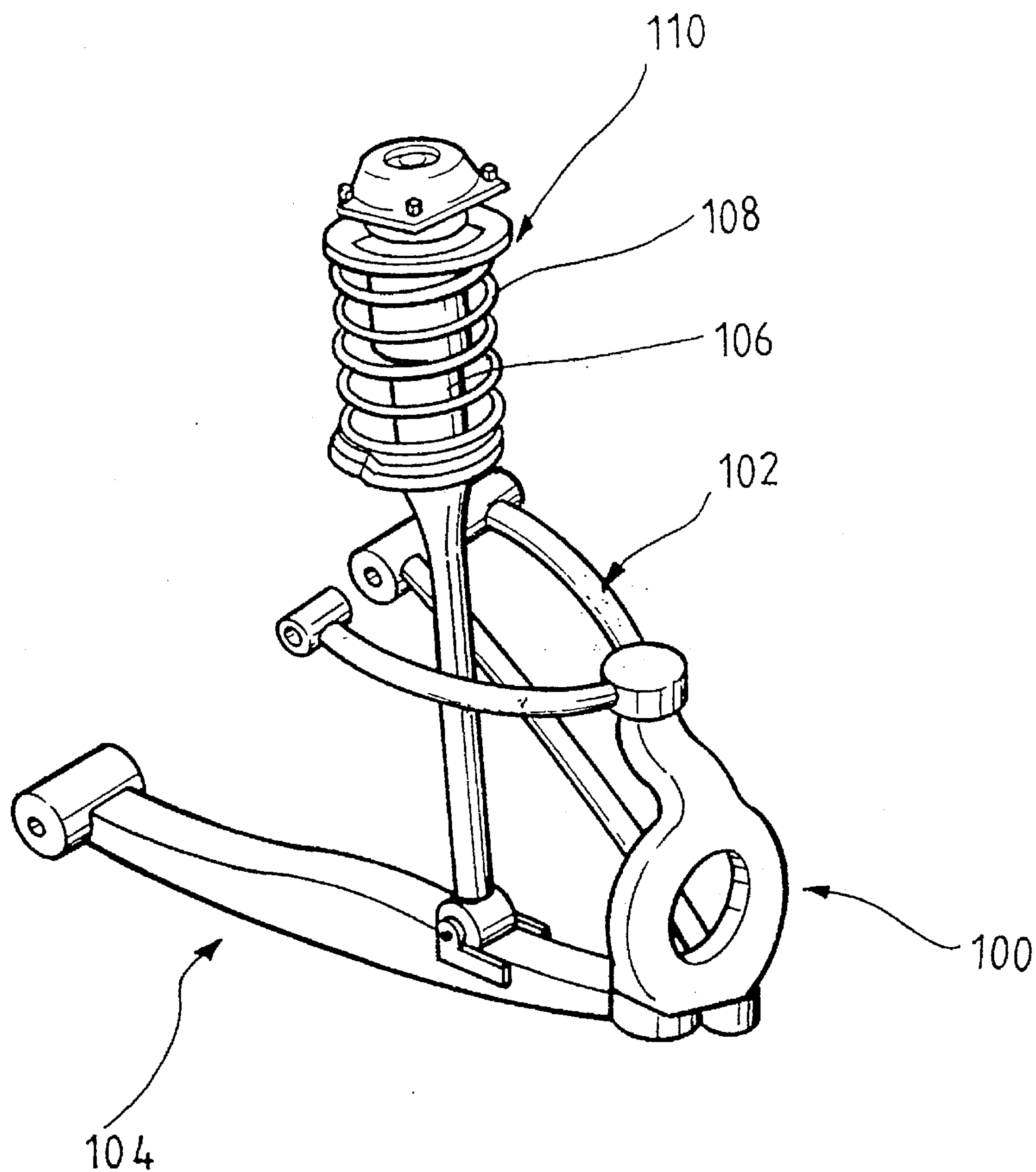
FIG. 4 is a view showing a conventional suspension system.

FIGS. 1 through 3 show an embodiment of a suspension system according to the present invention.

A wheel carrier 2 rotatably supports a wheel 1, and a central part of the wheel carrier 2 has a through hole 20 through which an axle 21 can pass.

A spindle, not shown, is provided in the end of the axle so that it can drive the wheel.

The upper part of the wheel carrier 2 has an extending portion 22 which is bent toward the wheel side and there is a gap between an upper end of the extending portion 22 and the upper side of the wheel 1.

The reason that the extending portion 22 is bent is to prevent the wheel 1 from interfering with the extending portion 22.

An upper control arm 3 connects the extending portion 22 with a vehicle body 6.

A wheel side connecting portion 30 of the upper control arm is connected with the upper end of the extending portion 22 of the wheel carrier 2 by a ball joint, and a vehicle body side connecting portion 31 is diverged into front and rear links and each link is connected with the vehicle body 6 by an elastic bushing such as a rubber bushing.

A lower control arm 4 connects the lower part of the wheel carrier 2 with the vehicle body 6, and includes a front arm 40 and a rear arm 41.

Wheel side connecting portions 42, 43 of the respective arms 40, 41 are connected with the lower part of the wheel carrier 2 by a ball joint or rubber bushing having appropriate strength.

Vehicle body side connecting portions 44, 45 are connected with a sub frame 8 by an elastic bushing such as a rubber bushing.

The rubber bushings used in the above connections have appropriate elasticity, and can control up and down vibration of the control arms 3, 4.

An absorbing device 5 is formed by two absorbing members 50, 51.

The absorbing member 50 is an assembly of a shock absorber 500 and a spring 501 and it is arranged in front of an axle 21, and the absorbing member 51 is an assembly of a shock absorber 510 and a spring 511 and it is arranged at the back of the axle 21.

The lower ends of absorbing members 50, 51 are respectively connected with the upper side of the front and the rear lower arm 40, 41 and the upper ends of the absorbing members 50, 51 are respectively connected with the supporting portions 80, 81 of the sub frame 8.

The supporting portions 80, 81 of the sub frame 8 are convex shapes to upright as shown in FIG. 1 and the upper ends of the absorbing members 50, 51 are respectively inserted into the supporting portions 80, 81, and the absorbing members 50, 51 are arranged to be declined toward the vehicle body side.

The absorbing members absorb up and down impact from roads.

A trailing arm 7 is arranged in a longitudinal direction of the vehicle, and a front side connection portion 70 of the trailing arm 7 is connected with the vehicle body or a side member by an elastic bushing, and a rear side connection portion 71 of the trailing arm 7 is connected with the front side of the wheel carrier 2 by an elastic bushing.

By providing the trailing arm, rigidity of the suspension system is increased.

Since the absorbing device 5 is separated into front and rear and arranged between the sub frame 8 and the lower control arm 4, impacts produced by up and down movement of the wheel 1 are distributed and reduced and then the impacts are transmitted through the sub frame 8 into the car body 6.

The invention can therefore substantially improve riding comfort.

Additionally, since the absorbing member 5 does not suspend and support the vehicle body 6, the invention can enlarge the inner space by as much space as the conventional absorbing member occupies as shown in FIG. 2 as an imaginary line.

Moreover, if Kf<Kr and Cf>Cr are established where Kf and Cf are respectively a spring constant and a damping coefficient of the front absorbing member 50, and Kr and Cr are respectively a spring constant and a damping coefficient of the rear absorbing member 51, the vehicle tends to be over steered at sudden cornering or immediately after the sudden cornering and the vehicle tends to be under steered at slow cornering or at rolling immediately after the slow cornering.

Thus, the invention can enhance both controllability and stability.

What is claimed is:

1. A rear suspension system for a vehicle comprising:

a wheel carrier rotatably supporting a wheel, said wheel carrier having a first portion extending above an upper and inner side of the wheel, and a second portion lower than the first portion having a through hole formed therein;

an axle member inserted into the through hole of said wheel carrier;

an upper control arm connecting an upper end of the first portion of the wheel carrier with a vehicle body;

a lower control arm having a wheel side end and a vehicle side end, the wheel side end connecting to the second lower portion of the wheel carrier;

a subframe connecting the vehicle side end of said lower control arm to the vehicle body;

a trailing arm disposed in a longitudinal direction of the vehicle connecting a front side of the wheel carrier with the vehicle body; and two absorbing members operatively connected respectively between said subframe and the lower control arm at a front and rear of said axle member.

2. The suspension system as set forth in claim 1, wherein the first portion of said wheel carrier is bent toward the wheel side forming a gap between the upper end of the first portion of said wheel carrier and the upper side of the wheel.

3. The suspension system as set forth in claim 1, wherein said upper control arm includes a wheel side connecting portion connected with the upper end of the first portion of the wheel carrier by a ball joint, and a vehicle body side connecting portion diverged into front and rear upper arm portions, each upper arm portion being connected with the vehicle body by an elastic bushing.

4. The suspension system as set forth in claim 1, wherein said lower control arm has a front arm and a rear arm, and wheel side connecting portions of each arm are coplanar and are connected with the second lower portion of the wheel carrier by ball joints, respectively, and vehicle body side connecting portions of each arm are connected with said subframe by elastic bushings, respectively.

5. The suspension system as set forth in claim 1, wherein said two absorbing members are each characterized as Kf<Kr and Cf>Cr, where a spring constant and a damping coefficient of the front absorbing member are Kf and Cf respectively, and a spring constant and a damping coefficient of the rear absorbing member are Kr and Cr, respectively.

6. The suspension system as set forth in claim 1, wherein said two absorbing members are inclined from the lower control arm toward the subframe.

7. The suspension system as set forth in claim 1, wherein said two absorbing members each comprise a shock absorber and a spring.

* * * * *